(12) United States Patent
Moretti et al.

(10) Patent No.: US 8,381,763 B2
(45) Date of Patent: Feb. 26, 2013

(54) GAS FILLING AND DISPENSING DEVICE, VESSEL WITH SUCH DEVICE, AND OPERATIONAL CIRCUIT

(75) Inventors: Alessandro Moretti, Brescia (IT); Philippe Pisot, L'Isle Adam (FR)

(73) Assignee: L'Air Liquide, SociétéAnonyme pour l'Etude et l'Exploitation des Procédés Georges Claude, Paris (FR)

( * ) Notice: Subject to any disclaimer, the term of this patent is extended or adjusted under 35 U.S.C. 154(b) by 279 days.

(21) Appl. No.: 12/867,395

(22) PCT Filed: Feb. 9, 2009

(86) PCT No.: PCT/FR2009/050202
§ 371 (c)(1),
(2), (4) Date: Aug. 12, 2010

(87) PCT Pub. No.: WO2009/101350
PCT Pub. Date: Aug. 20, 2009

(65) Prior Publication Data
US 2010/0326540 A1    Dec. 30, 2010

(30) Foreign Application Priority Data

Feb. 14, 2008 (FR) ..................................... 08 50946

(51) Int. Cl.
*F16K 31/12* (2006.01)
*F16K 17/40* (2006.01)
*F16L 37/28* (2006.01)
*B65B 1/04* (2006.01)

(52) U.S. Cl. ................. 137/505.11; 137/74; 137/599.09; 251/149.1; 141/346; 141/347; 141/354

(58) Field of Classification Search ..................... 137/73, 137/74, 505.11, 599.09; 251/149.1; 141/302, 141/346, 347, 353, 354
See application file for complete search history.

(56) References Cited

U.S. PATENT DOCUMENTS

| 841,196 | A | * | 1/1907 | Thorp | ....................... | 137/505.12 |
| 3,783,841 | A | * | 1/1974 | Hirschler et al. | ............. | 123/576 |
| 4,044,794 | A | * | 8/1977 | Matthews | ..................... | 137/613 |
| 4,424,830 | A | * | 1/1984 | Arnsperger et al. | .......... | 137/613 |
| 4,702,277 | A | * | 10/1987 | Ollivier | ........................ | 137/613 |

(Continued)

FOREIGN PATENT DOCUMENTS

| EP | 1 316 755 | 6/2003 |
| EP | 1 367 316 | 12/2003 |

OTHER PUBLICATIONS

International Search Report for PCT/FR2009/050202.

*Primary Examiner* — Stephen M Hepperle
*Assistant Examiner* — Kevin Barss
(74) *Attorney, Agent, or Firm* — Allen E. White

(57) ABSTRACT

The invention relates to a gas filling and dispensing device that comprises a body to be positioned in the opening of a pressurized gas storage tank, a gas-tapping circuit extending between a first upstream end to be connected to the inside of the tank and a second downstream end to be connected to a gas user, wherein the tapping circuit includes a first insulation valve, the device further including a safety valve subjected to the tank pressure for blocking or selectively opening a passage for the gas from the tank towards a discharge area based on the temperature and/or pressure of the gas in the tank relative to at least one predetermined threshold, characterized in that the discharge area of the safety valve is located upstream from the first insulation valve.

5 Claims, 5 Drawing Sheets

U.S. PATENT DOCUMENTS

Figure 1:
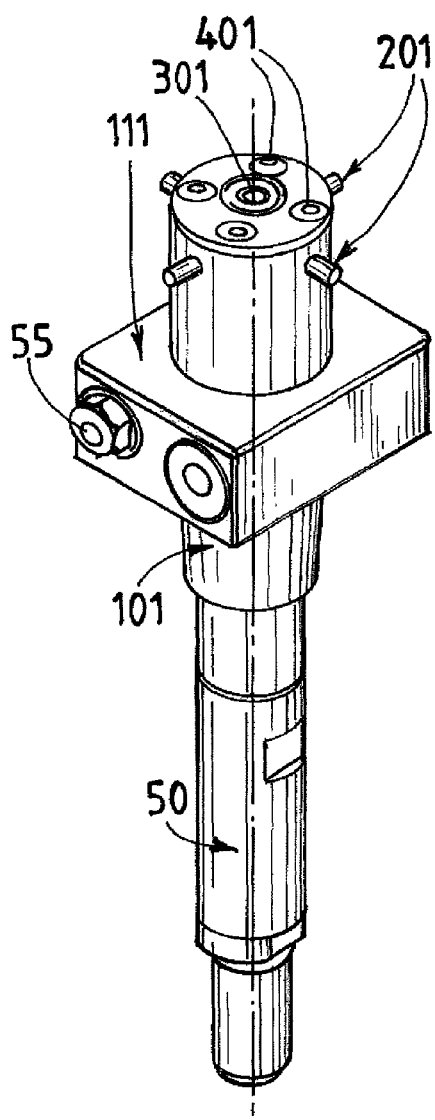

| | | | | |
|---|---|---|---|---|
| 4,925,196 A | * | 5/1990 | Green et al. | 180/170 |
| 5,458,151 A | * | 10/1995 | Wass | 137/613 |
| 5,562,117 A | * | 10/1996 | Borland et al. | 137/74 |
| 6,041,762 A | * | 3/2000 | Sirosh et al. | 123/529 |
| 6,766,829 B2 | * | 7/2004 | Takeda et al. | 137/877 |
| 7,013,916 B1 | * | 3/2006 | Pearlstein et al. | 137/613 |
| 2004/0000338 A1 | | 1/2004 | Heiderman | |
| 2004/0231734 A1 | * | 11/2004 | Larsen et al. | 137/613 |
| 2009/0223976 A1 | | 9/2009 | Denis et al. | |

* cited by examiner

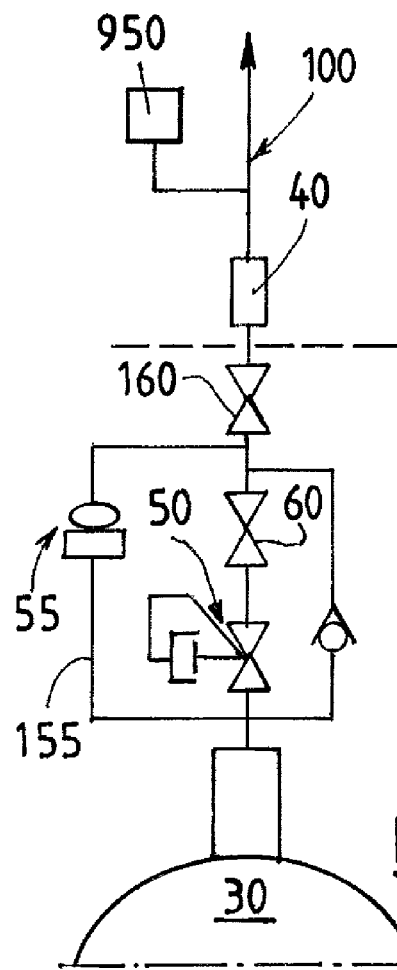
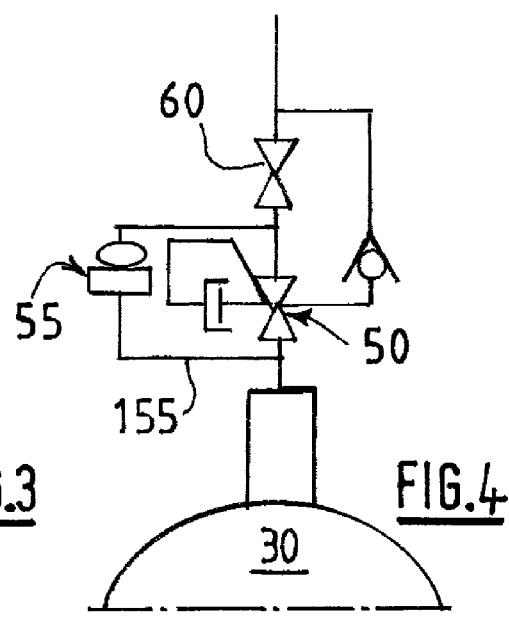
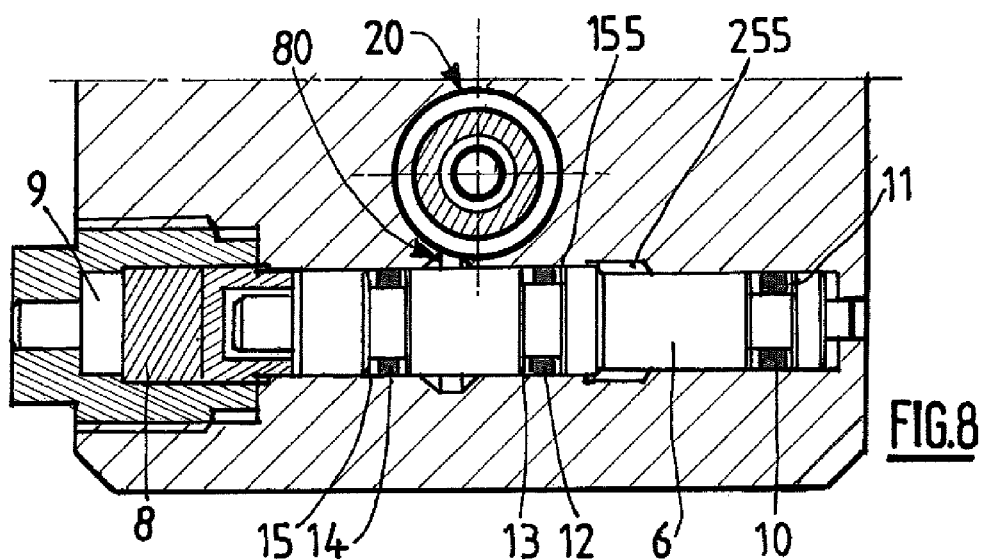

GAS FILLING AND DISPENSING DEVICE, VESSEL WITH SUCH DEVICE, AND OPERATIONAL CIRCUIT

The present invention relates to a gas filling and dispensing device, to a vessel and to a user circuit provided with such a device.

The invention relates more specifically to a gas filling and dispensing device comprising a body intended to be positioned in the orifice of a pressurized-gas storage reservoir, a gas withdrawing circuit running between an upstream first end intended to be connected to the inside of the reservoir and a downstream second end intended to be connected to a user of the gas, the withdrawing circuit comprising a first isolating valve, the device further comprising a safety relief valve intended to be subjected to the pressure in the reservoir in order selectively to close off or open a passage for the gas from the reservoir to a discharge zone according to the temperature and/or the pressure of the gas in the reservoir with respect to at least one set threshold.

Devices or valves, notably those with in-built regulators, for gaseous applications are known. In particular, for vehicle or fuel applications involving gaseous hydrogen, gas storage at very high pressure (700 bar and beyond) is planned. One solution is notably to plan for users to swap empty reservoirs for full reservoirs (particularly in zones where filling stations are inappropriate).

Current or future regulations anticipate the need for safety exhaust valves (PRDs) to release the gas stored in the reservoir in the event of a shock or fire (with a view to applications in vehicles in particular).

However, the applicant company has noticed that such a safety pressure relief valve (PRD) could create problems when several reservoirs of this type are being stored in a storage zone prior to use. The problem is that when the gas is flammable or dangerous, such as hydrogen, the activation of one safety pressure relief valve and the creation of a flame could, through a "domino" or "chain reaction" effect, cause the safety relief valves of the adjacent reservoirs to activate.

To solve this problem, one possible solution is to provide heat screens on the reservoirs or in their storage zone. However, these solutions are expensive and somewhat unsatisfactory.

It is an object of the present invention to alleviate all or some of the abovementioned disadvantages of the prior art.

To this end, the gas filling and dispensing device according to the invention, in other respects according to the generic definition given thereof in the above preamble, is essentially characterized in that the discharge zone of the safety relief valve is situated upstream of the first isolating valve.

Furthermore, some embodiments of the invention may comprise one or more of the following features:

- the withdrawing circuit comprises a pressure regulator, a low-pressure chamber and the first isolating valve which are arranged in series in that order from the upstream to downstream end, the discharge zone of the safety relief valve being situated downstream of the pressure regulator,
- the safety relief valve is situated in a pipe having a downstream end connected upstream of the first isolating valve and an upstream end connected, when in position mounted on a reservoir, to the inside of the reservoir,
- the gas withdrawing circuit comprises a second isolating valve,
- the second isolating valve is arranged between the pressure regulator and the first isolating valve,
- the discharge zone of the safety relief valve is situated between the first and second isolating valves,
- the safety relief valve comprises a fusible element butting against a member that is able to move selectively between a position of shutting off the passage to the discharge zone when the fusible element is not activated and a position of opening the passage to the discharge zone when the fusible element is activated,
- the moving member of the safety relief valve comprises a piston capable of translational movement in the body of the device and a system of seal(s) able to collaborate with a seat formed in said body,
- the passage for the gas to a discharge zone comprises a groove, the positions in which the passage to the discharge zone is closed off and opened being defined by the positions of the system of seal(s) relative to the groove,
- the moving member of the safety relief valve comprises a piston of the differential type only a determined fraction of the working surface area of which is subjected to the pressure in the reservoir so as to limit the force transmitted by the piston to the fusible element to a set value.

The invention also proposes a pressurized gas vessel comprising, arranged in its orifice, a gas filling and dispensing device according to any one of the features described hereinabove or hereinbelow.

According to another possible aspect, the applicant company is also proposing an assembly comprising a circuit for using a pressurized gas and a pressurized gas vessel according to any one of the features described hereinabove or hereinbelow, the vessel being selectively connectable to the user circuit via the gas filling and dispensing device, the circuit comprising a mechanism that forms a high-pressure safety relief valve able to discharge the pressurized exhaust gas to the atmosphere or to a set safe zone.

According to one advantageous possible feature, the user circuit comprises a member (such as a spindle) that has a first position in which the first valve is selectively open (the second valve is closed) and a second position in which the first and second valves are open.

The invention may also relate to any alternative device or method comprising any combination of the method and/or device features listed hereinabove or hereinbelow.

Figure 2:
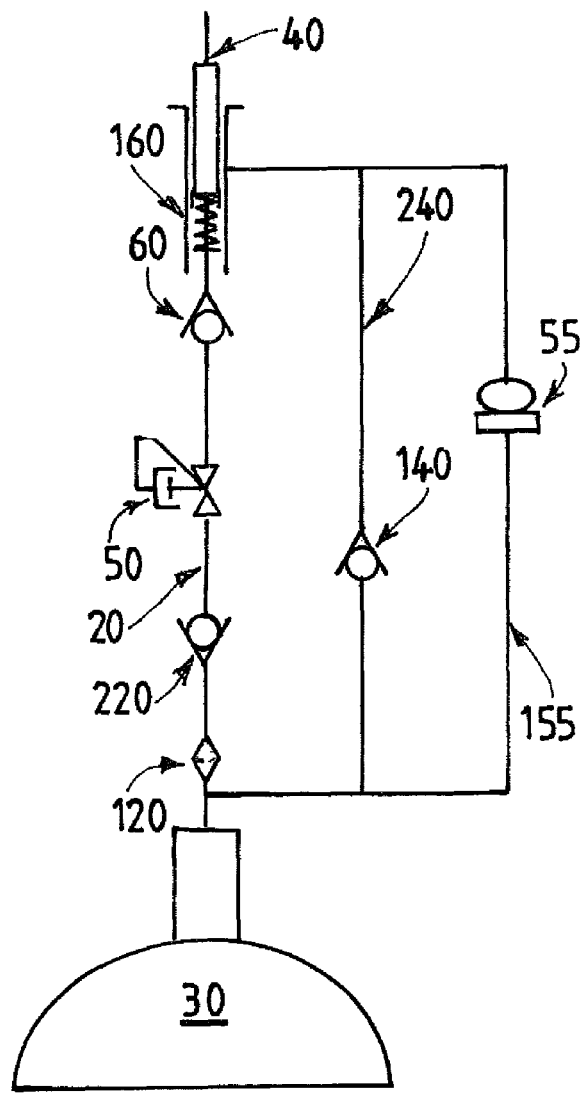
Figure 5:
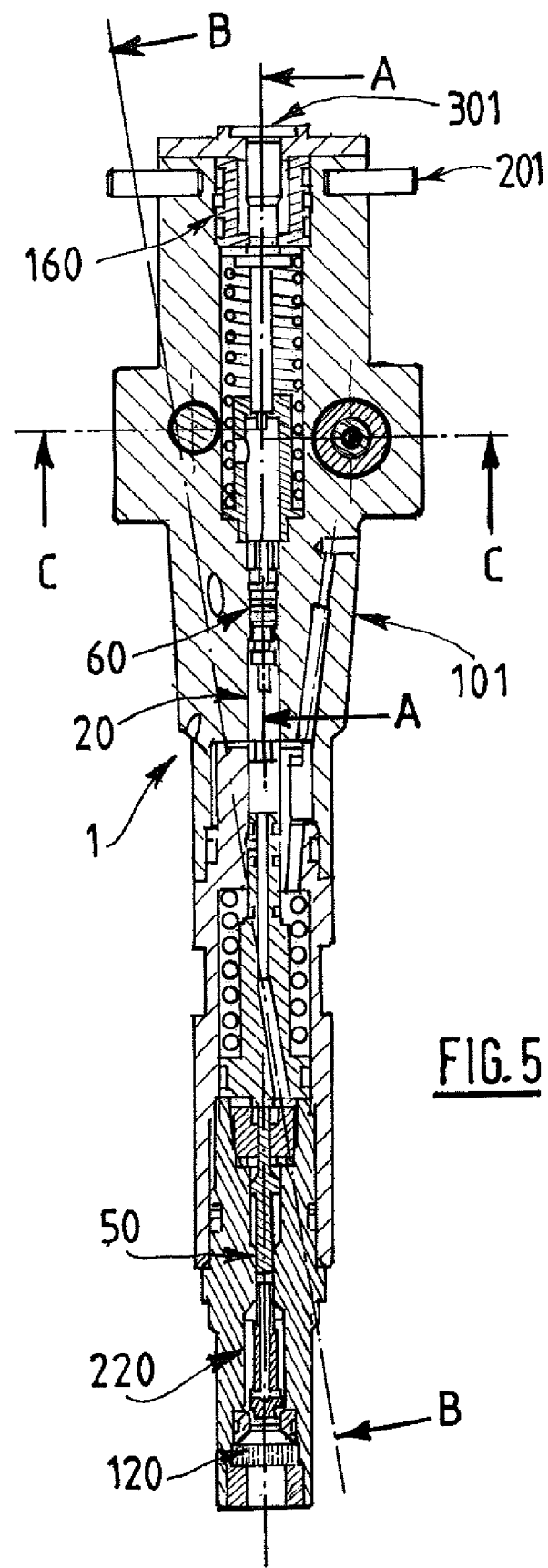
Figure 6:
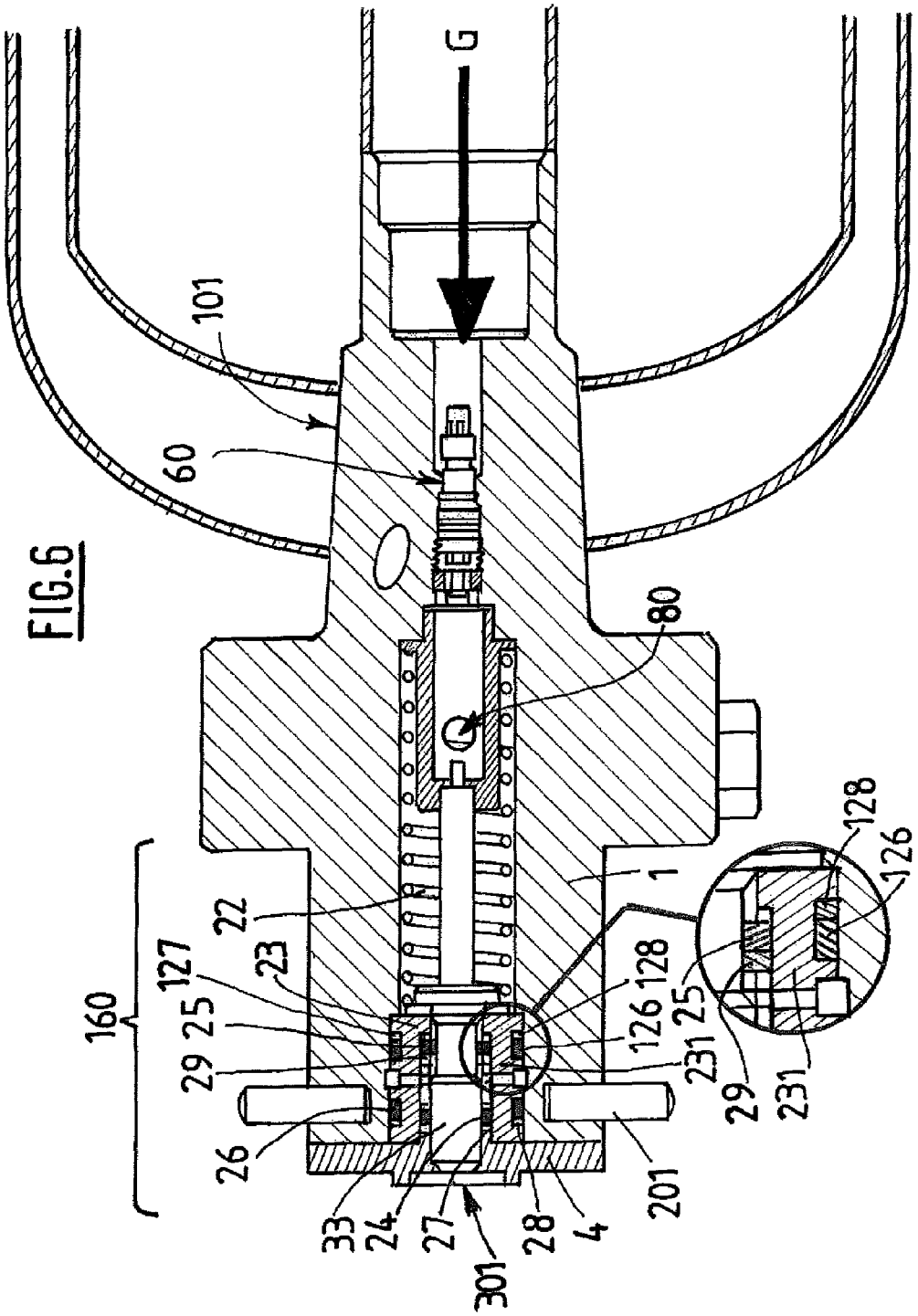
Figure 7:
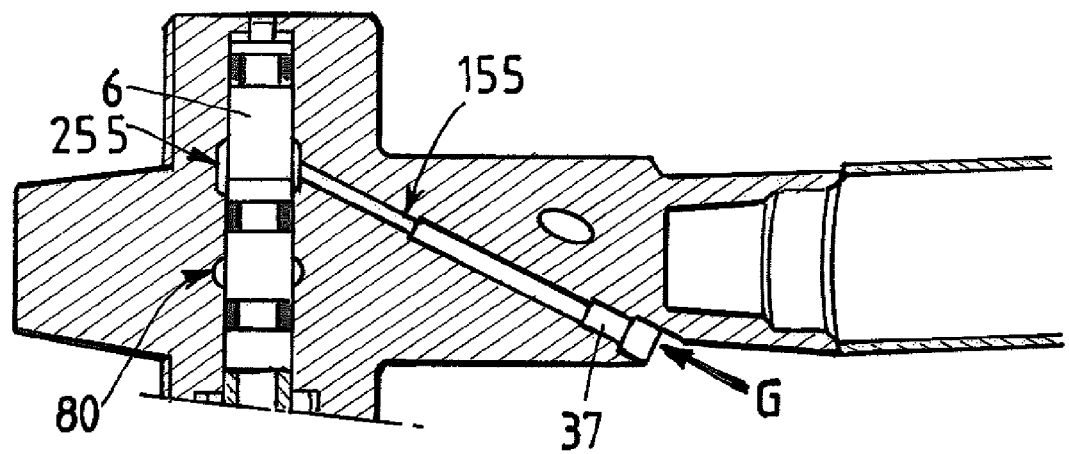
Figure 9:
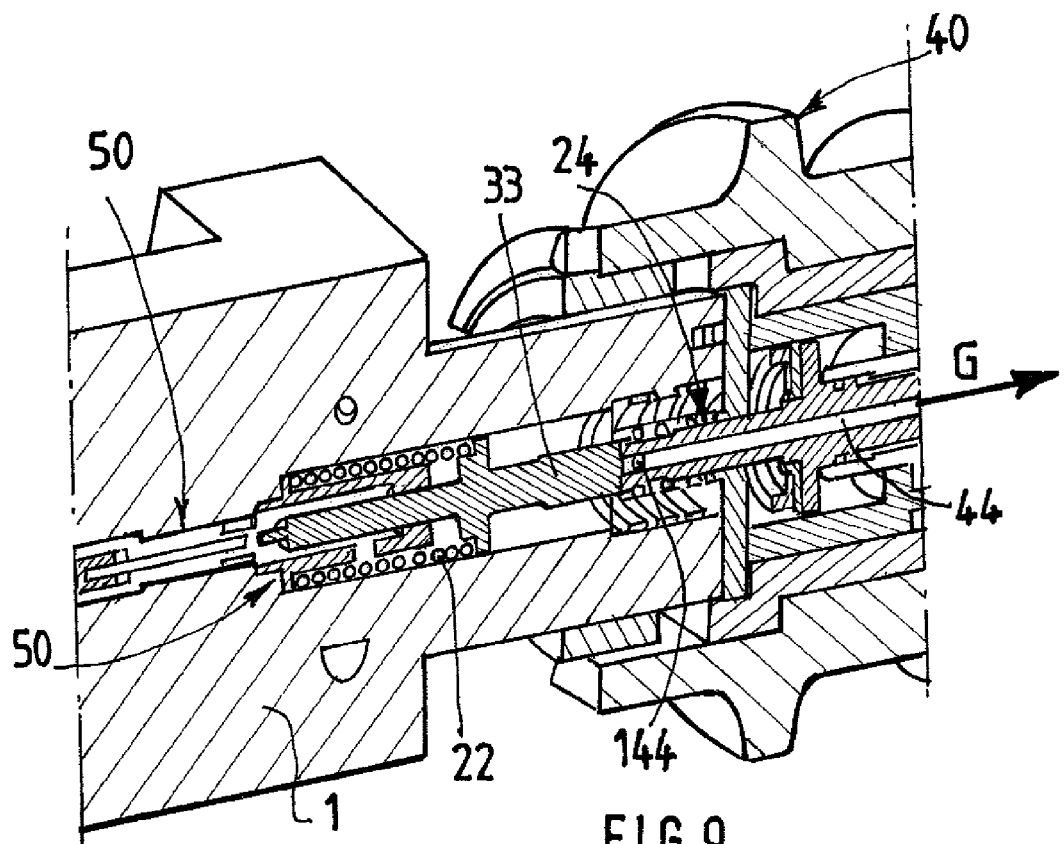

Other particulars and advantages will become apparent from reading the description hereinafter, which is given with reference to the figures in which:

FIG. 1 depicts a perspective and schematic view illustrating one possible embodiment of a gas filling and dispensing device according to the invention, FIGS. 2 to 4 schematically depict the structure and operation of three possible and nonlimiting embodiments of the gas filling and dispensing device according to the invention, FIG. 5 is a view in longitudinal section of the gas filling and dispensing device of FIG. 1 on a first plane of section, FIG. 6 depicts a view in longitudinal section of the gas filling and dispensing device of FIG. 1, in position mounted in a reservoir and on a second plane of section (embodied by the line A-A in FIG. 5), FIG. 7 depicts a view in cross section of the gas filling and dispensing device of FIGS. 1 and 5 on a first plane of section (embodied by the line B-B in FIG. 5), FIG. 8 depicts a cross section of the gas filling and dispensing device of FIGS. 1 and 5 on a second plane of section (embodied by the line C-C in FIG. 5), FIG. 9 depicts a view in longitudinal and partial section of the gas filling and dispensing device of FIGS. 1, 2 and 5 to 9 in position coupled to a user component.

The invention will now be described with reference to FIGS. 1 to 9 which illustrate entirely nonlimiting application examples. In particular, the invention can also be applied to any other type of device or valve. The invention may notably be applied to the devices described in documents WO 2007/048954 A1 or WO 2007/048957.

The gas filling and dispensing device comprises an oblong body 1 the lower end of which is intended to be lodged preferably in part in a reservoir. The device notably incorporates a gas pressure-relief portion (pressure regulator 50) and a coupling region 101 (such as a screw thread or the like) for fixing it into the neck of a reservoir (cf. FIGS. 1, 5 and 6). The upper end of the device forms a head 111 (for example out of the reservoir notably comprising a safety relief valve 55, a gas filling/withdrawing orifice 301 and connection members 201 which are intended to collaborate with complementary connection members belonging to a user system (which has not been depicted in FIG. 1).

With reference to FIG. 5, the device comprises a withdrawing circuit 20 comprising, from the downstream to upstream direction (that is to say from the external orifice 301 toward the reservoir): a first valve 160, a second isolating valve 60 and a pressure regulator 50.

Of course the device may comprise other members which for the sake of conciseness have not been described. In particular, regarding the detail of the internal arrangement of the device 1 (regulator, filter(s), valve(s)), reference may, for example and entirely nonlimitingly, be made to document WO 2007048957.

FIG. 2 schematically depicts one possible structure according to the invention. The withdrawing circuit 20 comprises, from the upstream to downstream direction, a filter 120, a non-return valve 220, the regulator 50, the second isolating valve 60 and the first isolating valve 160 (the latter is preferably coupled to quick fit connection means intended to collaborate with a filling/withdrawing tapping of a user system 40). The device 1 comprises a filling pipe 240, preferably distinct from the withdrawing circuit 20. The filling circuit 240 comprises a valve 140 and has one end connected for example upstream of the filter 120 and another end connected upstream of the first valve 160.

The device 1 further comprises a safety relief valve 55 housed in a pipe 155 connected, on the one hand, to the inside of the reservoir 30 (upstream of the filter 120) and, on the other hand, upstream of the first valve 160.

Thus, any gas that may be discharged by the safety relief valve 55 is directed into the low-pressure chamber which is isolated from the outside by the first valve 160. This then avoids the release of dangerous/flammable gases to the outside and reduces the risk of external combustion. The gas released by the safety relief valve 55 is rather released to the outside in a controlled fashion via the outlet orifice 301 (the orifice used for withdrawing and preferably also for filling). For example, this discharge gas is discharged by the user member that is connected to the device when it opens the first valve 160 (for example via a system provided for that purpose). This is particularly advantageous from a safety standpoint, particularly in the case of applications that use a fuel containing gaseous hydrogen (vehicles).

FIGS. 5 to 9 illustrate one nonlimiting exemplary embodiment in greater detail.

The gas G contained in the reservoir 30 enters the body of the device via a pipe 155 (see FIGS. 7 and 8) comprising a nozzle 37 and opens radially in the region of a moving piston 6 that forms part of the safety relief valve 55 mechanism.

The piston 6 is subjected to the pressure of the gas in the direction of an end stop comprising a component 8 made of a fusible material such as a eutectic alloy made up, for example, of tin and/or of bismuth and/or of lead and a porous plug 9.

As depicted, the piston 6 is preferably of the differential type, that is to say that just part of its surface area (cross-sectional area) is subjected to the pressure of the gas, so as to limit the force transmitted to the fusible material 8. Of course, any other type of arrangement and geometry of the piston 6 and fusible material 8 may be envisioned.

The gas emerges around the piston 6 in a circular groove 255 (cf. FIG. 8). Under normal circumstances, the gas remains confined to this groove 255 by means of a pair of O-ring seals 10, 12 each associated with an anticreep ring 11, 13. The seals 10, 12 and anti-creep rings 11, 13 are carried by the piston 6 and are spaced apart in the longitudinal direction of the piston 6. The first seal 12 situated on the fusible material side is preferably larger in size than the second seal 10. This second seal 10 provides sealing towards the outside by preventing gas from escaping there. The first seal 12 provides sealing with respect to the internal circuit of the body of the device. More specifically, the first seal 12 prevents the gas from reaching a second groove 80 which communicates with the low-pressure chamber situated between the two valves 60, 160 of the withdrawing circuit 20 (in the example depicted, the piston 6 slides in a direction substantially perpendicular to the longitudinal direction of the withdrawing circuit 20). The piston 6 may have a third seal 14 and anticreep ring assembly on the fusible element 8 side.

This low-pressure chamber situated downstream of the second valve 60 therefore also receives the gas expanded by the regulator 50 when the second valve 60 is open (for example via a dip member that forms part of the user system, cf. FIG. 9).

As depicted in FIG. 6, this low-pressure chamber is isolated from the outside via the first valve 160 made up of a shutter 33 capable of translational movement and subjected to the action of a return spring 22 returning it towards a position in which the outlet orifice 301 is closed. All the sealing required in order for this valve 160 to function may be afforded by the O-ring seals 24, 25, 26 and 126 which are associated respectively with the anticreep rings 27, 127, 28 and 128, each of these seal/ring pairs [24; 27], [25; 127], [26; 28] and [126; 128] being housed in a channel of a cannula 23. Said cannula 23 is contained inside the body of the device 1 via a cover 4 connected to the body of the device 1 by the fixing elements 401 (see FIG. 1). The seal/ring pairs [26; 28] and [126; 128] are situated on the external cylindrical surface of the cannula 23 on each side of radial holes 231 formed in the cannula 23 so as to ensure sealed continuity of the filling pipe 240 between the body of the device 1 and the cannula 23. The seal/ring pairs [25; 127] and [24; 27] are situated on the internal cylindrical surface of the cannula 23 on each side of the radial holes 231 formed in the cannula 23 so as to ensure sealed continuity of the filling pipe 240 between the reservoir filling tool (when connected) and the cannula 23 or, in the case of the seal/ring pair [24; 127] so as to form a second barrier for gas between the shutter 33 (when it has been returned by the spring 22 to a position in which the orifice 301 is closed) and the cannula 23.

When the safety relief valve 55 is active (the pressure and/or the temperature has exceeded a threshold), the fusible material 8 is no longer able to withstand the force transmitted by the piston 6 and moves aside. As a result, under the action of the pressure of the gas, the piston 6 moves toward the volume opened up by the fusible element 8 (to the left in FIG. 8) and the first seal 12 of the piston 6 then enters the second groove 80, doing away with the sealing with respect to the internal circuit. The gas G from the pipe 155 is then allowed to enter this groove 80 and access the low-pressure chamber upstream of the first valve 160.

The piston 6 is dimensioned to prevent the second seal 10 from entering the first groove 255, so as to maintain sealing at the other end of the piston 6.

When the device 1 is not connected to a user system, the seal 24 and the moving shutter 33 prevent gas from escaping to the outside. By contrast, when the device is connected to a user system, a spindle 44 may enter the orifice 301 of the device. The spindle 44 may, for example, have radial orifices 144 at its end to communicate with the low-pressure chamber. The gas then passes, for example, via a central channel formed in the spindle 44. The seal 24 seals against the spindle 44.

FIG. 9 depicts the device 1 connected to a user system 40 of which the spindle 44, fitted into the orifice 301, is sealed against the O-ring/anti-creep ring pair [24; 27]. The end of the spindle 44 is in contact with the end of the moving shutter 33, forcing it to move in the direction of the second valve 60 by overcoming the force of the return spring 22. The spindle 44 may have two stable and distinct positions. A first stable position in which the spindle 44 causes the moving shutter 33 to move without opening the second valve 60 (the expanded gas from the regulator 50 is not delivered to the user system) and a second position in which the spindle 44 causes the moving shutter 33 to move and open the second valve 60 (the expanded gas from the regulator 50 is delivered to the user system). As soon as the device 1 is connected to a user system 40, whichever of the two aforementioned stable positions the spindle 44 is occupying, any stream of gas arriving in the low-pressure chamber from the safety relief valve 55 via the pipe 155 is discharged to the outside via the radial orifices 144 and the central channel of the spindle 44.

FIG. 3 schematically illustrates the connection between the reservoir 30/device 1 assembly and a user 40 circuit 100 comprising a safety mechanism 950.

The high-pressure gas escaping from the reservoir (contained in the low-pressure chamber in the event of overheating or an anomaly) is managed by the user circuit 100 when the user member 40 opens the first valve 160. This high-pressure exhaust gas can be discharged to the safety relief valve 950 which, thanks to a discharge shaft or the like, leads the fluid into the atmosphere in a known controlled area (particularly when the circuit 100 forms part of a vehicle).

When the user member opens the second valve 60, the expanded gas is then allowed to enter the user circuit 100.

Thus, any gas discharged (in the event of a raised pressure or an abnormally high temperature) leaves via the orifice 301 (which is preferably a single orifice) which is also used for filling and possibly for withdrawing.

The gas thus uses one and the same orifice 301 for filling/withdrawing/discharging in the event of overpressure. This allows for a single connection to the reservoir and therefore simplifies the operations for a user. The gas discharged in the event of overpressure in the reservoir can thus be collected via this orifice toward a user circuit 100, toward a safe area. This feature is particularly advantageous when the gas is a hazardous gas such as hydrogen.

Of course, the invention is not restricted to the exemplary embodiment of FIGS. 5 to 9 any more that it is restricted to the structure of FIGS. 2 and 3. Thus, for example, FIG. 4 illustrates an embodiment variant in which the device has just one isolating valve 60. In this case, any gas that might be released by the safety relief valve 55 can be directed between the regulator 55 and the valve 60.

Of course, it is possible to conceive of other types of arrangement (in which the discharge region of the safety relief valve 55 is upstream of the two valves 60, 160 of FIG. 2).

Likewise, the invention can be applied to a gas filling and distributing device that does not have a pressure regulator 50.

What is claimed is:

1. A gas filling and dispensing device comprising a body adapted for operable fluid connection to an orifice of a pressurized-gas storage reservoir, a gas withdrawing circuit running between an upstream first end adapted for operable fluid connection to an inside of the reservoir and a downstream second end adapted to be connected to a user of the gas, the withdrawing circuit comprising a first isolating valve, the device further comprising a safety relief valve configured to be subjected to the pressure in the reservoir, wherein the safety relief valve is adapted to close or open a passage for the gas from the reservoir to a discharge zone according to the temperature and/or the pressure of the gas in the reservoir with respect to at least one set threshold, characterized in that the discharge zone of the safety relief valve is situated upstream of the first isolating valve, wherein the gas withdrawing circuit comprises a second isolating valve, and wherein the discharge zone of the safety relief valve is situated between the first and second isolating valves.

2. A gas filling and dispensing device comprising a body adapted for operable fluid connection to an orifice of a pressurized-gas storage reservoir, a gas withdrawing circuit running between an upstream first end adapted for operable fluid connection to an inside of the reservoir and a downstream second end adapted to be connected to a user of the gas, the withdrawing circuit comprising a first isolating valve, the device further comprising a safety relief valve configured to be subjected to the pressure in the reservoir, wherein the safety relief valve is adapted to close or open a passage for the gas from the reservoir to a discharge zone according to the temperature and/or the pressure of the gas in the reservoir with respect to at least one set threshold, characterized in that the discharge zone of the safety relief valve is situated upstream of the first isolating valve, wherein the safety relief valve comprises a fusible element butting against a member that is adapted to move selectively between a position of shutting off the passage to the discharge zone when the fusible element is not activated and a position of opening the passage to the discharge zone when the fusible element is activated.

3. The device of claim 2, wherein the moving member of the safety relief valve comprises a piston capable of translational movement in the body of the device and a system of one or more seals adapted to operably cooperate with a seat formed in said body.

4. The device of claim 3, wherein the passage for the gas to a discharge zone comprises a groove, the positions in which the passage to the discharge zone is closed off and opened being defined by the positions of the system of one or more seals relative to the groove.

5. The device of claim 2, wherein the moving member of the safety relief valve comprises a piston of the differential type wherein the piston is configured so that only a determined fraction of the working surface area is subjected to the pressure in the reservoir so as to limit the force transmitted by the piston to the fusible element to a set value.

* * * * *